United States Patent [19]
Rowley

[11] 4,320,717
[45] Mar. 23, 1982

[54] SEA LIFE HABITAT APPARATUS

[75] Inventor: Paul R. Rowley, Goleta, Calif.

[73] Assignee: Atlantic Richfield Company, Los Angeles, Calif.

[21] Appl. No.: 250,345

[22] Filed: Apr. 2, 1981

[51] Int. Cl.³ .............................................. A01K 61/00
[52] U.S. Cl. ............................................ 119/4; 119/2
[58] Field of Search ................................... 119/4, 2, 3

[56] References Cited
U.S. PATENT DOCUMENTS 3,641,982  2/1972  Woodridge et al. ..................... 119/4
3,870,019  3/1975  McNicol ................................. 119/4
4,007,709  2/1977  Wishner ................................. 119/2
4,182,270  1/1980  Fourcher ................................ 119/4
4,279,218  7/1981  Brinkworth ............................ 119/2

Primary Examiner—Hugh R. Chamblee
Attorney, Agent, or Firm—Roderick W. MacDonald

[57] ABSTRACT

Apparatus for growing sea life in an enclosed habitat in the sea which employs a plurality of enclosed modules for containing the sea life and a plurality of feed riser conduits which pass through the plurality of modules but each riser feeds only a single module regardless of the order of stacking of the modules.

5 Claims, 9 Drawing Figures ic patent 4,320,717

SEA LIFE HABITAT APPARATUS

BACKGROUND OF THE INVENTION

Sea life, particularly rock-clinging gastropod mollusks such as abalone and the like, have been experimentally grown in an enclosed habitat comprising a cage suspended from an anchored structure in the sea such as an offshore drilling platform.

Although a suspended cage is quite acceptable from an experimental point of view, the continuous motion of the ocean causes wear on the suspension apparatus and could eventually cause suspension failure and loss of the habitat so that such an approach is not desirable from a long-term commercial point of view.

This invention is directed towards a sea life habitat apparatus which is adapted to continuous commercial use employing a plurality of stacked individual sea life habitat modules so that the modules can be stacked upon one another using any module in any position in the stack while retaining the capability of passing feed to each module independently of the other modules in the stack.

SUMMARY OF THE INVENTION

According to this invention there is provided an apparatus for growing sea life which employs a plurality of upwardly stacked individual habitat modules resting on a support means which in turn is carried by a base means that rests on the sea floor. The apparatus employs guide means for guiding the modules into the stacked configuration as they approach the support means and for retaining the stacked modules in the stacked configuration notwithstanding sea currents and the like. The apparatus also employs a plurality of feed risers, each feed riser being adapted to feed a single module in the stack.

The construction of the individual modules and the feed risers is such that any module can be indiscriminately employed in any position in the stack and an individual riser will still pass feed only to a single module in the stack. This allows for substantial operating efficiency. For example, when all modules are at the surface of the sea for recovering grown sea life therefrom and depositing therein young sea life for their period of growth in the sea, the modules need not be kept in any specific order but rather can be indiscriminately chosen and lowered to the support surface without worrying about whether a certain module will be fed by a certain feed riser. This is possible because, by the construction of this invention, any module can be fed by any feed riser but yet only a single feed riser feeds a single module in the stack as will be disclosed in greater detail hereinafter.

This invention also employs specially designed and constructed habitat modules for carrying out the above-described functions of the apparatus of this invention.

Accordingly, it is an object of this invention to provide a new and improved apparatus for growing sea life in a captive habitat in the sea.

Other aspects, objects and advantages of this invention will be apparent to those skilled in the art from this disclosure and the appended claims.

DETAILED DESCRIPTION OF THE INVENTION

Figure 1:
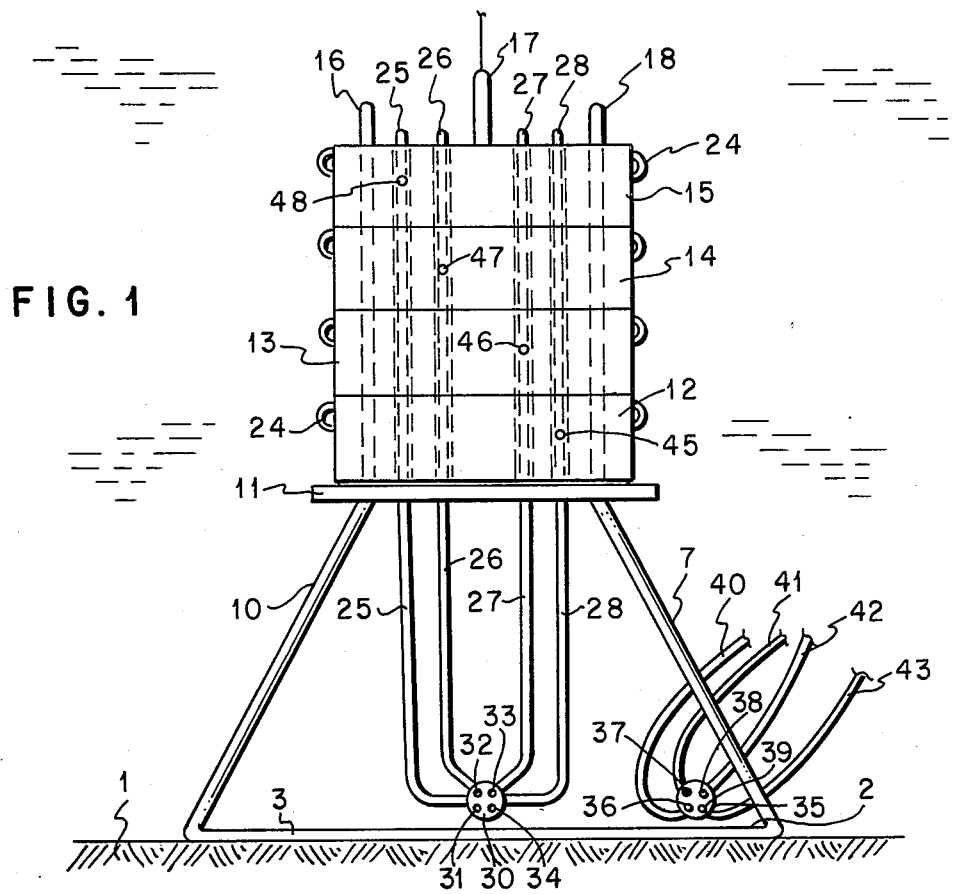
FIG. 1 shows a front view of the apparatus according to this invention in place in the sea.

More specifically, FIG. 1 shows ocean floor 1 having base 2 resting thereon.

Figure 2:
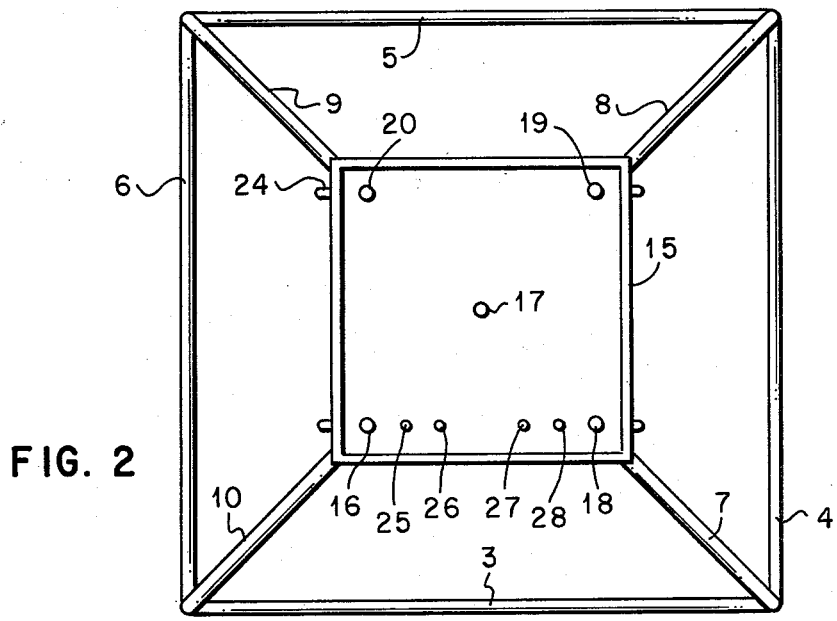
FIG. 2 is a top view of the apparatus of FIG. 1.

As can be seen from FIGS. 1 and 2, base 2 is composed of four tubular members 3, 4, 5 and 6 connected together and carrying at their joined corners upstanding, inwardly extending tubular members 7, 8, 9 and 10 which terminate in a raised platform or support means 11. Support 11 is essentially parallel to base 2 and sea floor 1. Resting on support 11 are four upwardly stacked modules 12, 13, 14 and 15 which rest on top of one another and which were guided on to the top of one another when being lowered towards support 11, and which are held in such stacked relation by guide means 16, 17, 18, 19 and 20, the top ends of which can be seen protrudng from the top surface of upper module 15 by reference to FIG. 1.

Each module carries at each outer corner thereof a lift ring 24 which is used for connecting a line (not shown) thereto for lowering the module through the sea down to support 11 and raising it back to the water surface.

FIG. 1 shows support means 11 to carry four upstanding feed riser conduit means 25, 26, 27 and 28, which extend through the full length of the stacked modules 12 through 15 and protrude from the top of upper module 15. These risers also extend down to a flange means 30 which is supported on base member 3.

Flange 30 has apertures 31, 32, 33 and 34 which correspond, respectively, to feed risers 25, 26, 27 and 28. For example, material passing through aperture 31 passes into the interior of riser 25. Similarly, material passing through aperture 32 passes only into the interior of riser 26, and so on. This way a similar flange means 35 which is adapted to connect with flange means 30 so that apertures 36, 37, 38 and 39 in flange 35 mate with apertures 31, 32, 33 and 34, respectively. Flanges 30 and 35 meet in a sealing manner so that, for example, material passing through aperture 39 into aperture 31 is sealed off from and prevented from entry into any of the other apertures 32 through 34.

Flange 35 has connected thereto four water surface conduit means 40, 41, 42 and 43 connecting, respectively, to apertures 36 through 39. The water surface conduit means extend from flange 30, when flange 35 is connected thereto, up to the water surface so that a feed boat floating on the water surface can pass feed material to any desired module or all modules. For example, feed can be passed down through conduit 40, through aperture 36, into aperture 34, and up into riser 28 to feed only the interior of module 12 as will be explained later.

Riser 28 has an aperture 45 therein which is in communication with the interior of module 12 so that the feed material that starts out in conduit 40 at the feed boat ends up passing by way of aperture 45 into the interior of module 12 to feed only the sea life in that individual module, there being no other apertures over the length of riser 28.

There are other apertures staggered upwardly in the risers so that each riser feeds only one module in the stack. For example, aperture 46 in riser 27 is higher than aperture 45 and corresponds with the elevation of module 13 so that the sea life in module 13 is fed by way of line 41 and riser 27 only. Similarly, aperture 47 in riser 26 is higher than aperture 46 so that aperture 47 corresponds in elevation with module 14 and the sea life in module 14 is fed only by surface conduit 42 and riser 26. Finally, aperture 48 in riser 25, the highest aperture, corresponds with highest module 15 for feeding the sea life in that uppermost module.

This invention is not limited to four modules. For example, a minimum of two modules can be employed or substantially more than four modules can be employed depending upon the desires of the operator. The number of feed risers, however, correspond to the number of modules in the stack so that there is an aperture in each feed riser corresponding with each module.

Each of modules 12 through 15 have an individual, enclosed feed compartment corresponding to each of feed risers 25 through 28 so that each feed riser can extend through the entire height of the module stack as shown in FIG. 1. Thus, the feed risers can also serve as guide means in addition to or in place of one or more guide means 16 through 20, if desired. Note, however, that there is only a single aperture in each riser and that aperture corresponds to a different module from riser to riser. Thus, each of modules 12 through 15 has four feed compartments extending therethrough so that each of risers 25 through 28 can extend through the four feed compartments of each module.

It is important to note that only one feed compartment in module 12 contains aperture 45 in riser 28 and that, similarly, only one feed compartment in module 13 contains aperture 46 in riser 27 and so on. This is an aspect of this invention which allows for the indiscriminate stacking of modules 12 through 15 when they are removed from support 11, brought to the surface of the water, and then replaced on support 11. For example, in accordance with this invention, when modules 12 through 15 are at the water surface and are to be relowered to support 11, any of the modules can be lowered first. Put another way, module 12 does not always have to be lowered first followed by module 13 and so on. In accordance with this invention, any of modules 13 through 15 could be lowered first and any of the remaining modules could be lowered second, because by this invention it matters not in what order modules 12 through 15 are lowered while still retaining the individual module feeding feature of this invention as will be seen more clearly hereinafter.

Figure 3:
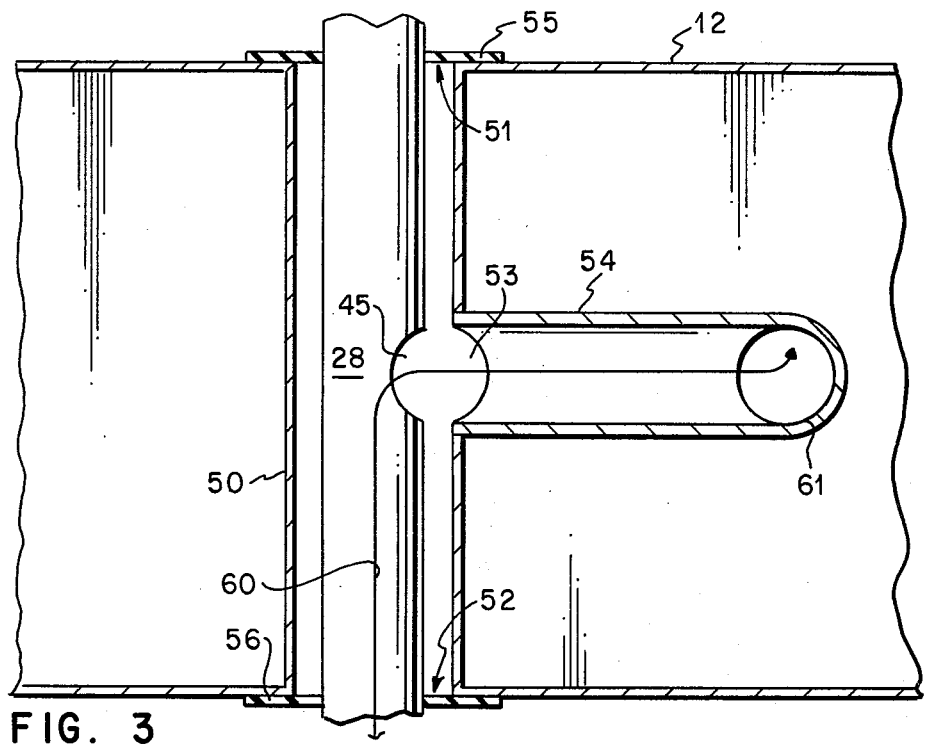
FIG. 3 is an enlarged view of the interrelationship of an operable section of feed riser and a module feed compartment and outlet conduit in the apparatus of FIG. 1.

FIG. 3 shows a side view of riser 28 in the interior of module 12 when viewed from the left side of riser 28 as viewed in FIG. 1.

More specifically, FIG. 3 shows a cross-sectional interior view of module 12 and reveals closed feed compartment 50 which, in this embodiment, is a circular cylinder which is totally closed except for top and bottom annular apertures 51 and 52, respectively, where riser 28 leaves and enters module 12, and side aperture 53 which is operably connected to permanently open outlet conduit 54.

Top and bottom apertures 51 and 52 are closed with annular seal means 55 and 56, respectively. Each seal means bears against the outer periphery of riser 28 and thereby closes the top and bottom of feed compartment 50. This way, feed passing, for example, from the water surface through line 40, aperture 36, aperture 34, and riser 28 exits as shown by arrow 60 out of riser 28 through aperture 45 into compartment 50. Compartment 50, being closed at its top and bottom allows feed 60 only to pass through aperture 53 into outlet conduit 54. Outlet conduit 54 is operably connected to manifold means 61 which will be described in greater detail hereinafter.

Figure 4:
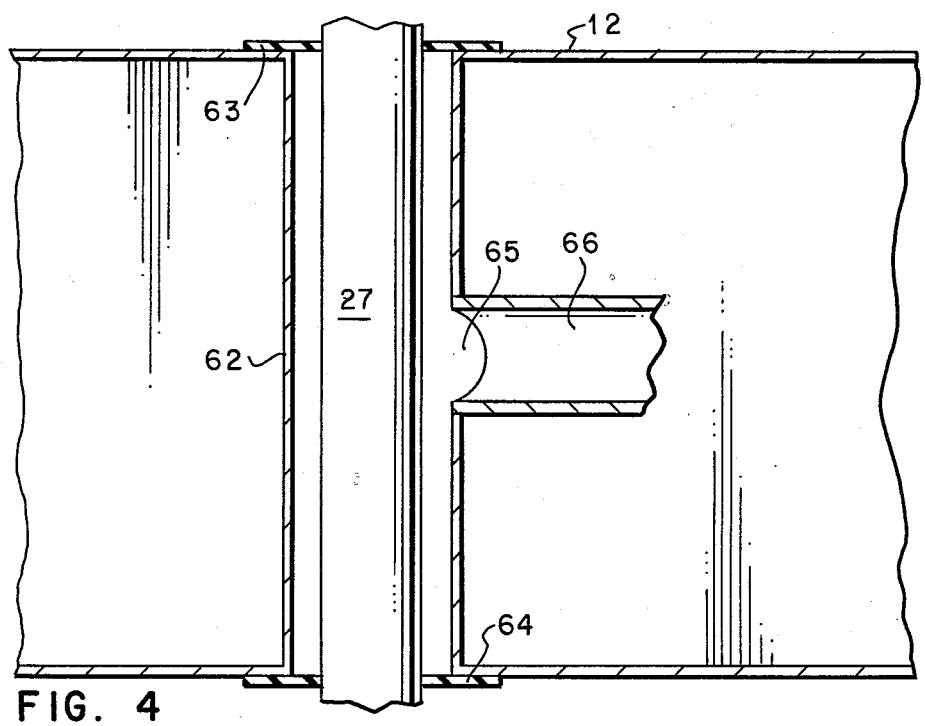
FIG. 4 is an enlarged view of an inoperable section of feed riser and its relationship to a feed compartment of the same module of FIG. 3.

FIG. 4 also shows a cross section of module 12 but this time the cross section, instead of being across riser 28 as shown in FIG. 3, is across adjacent riser 27. Riser 27 also passes through a feed compartment 62 which, like compartment 50, is closed at its top and bottom with seal means 63 and 64, and has a side aperture 65 connected to permanently open outlet conduit means 66. However, riser 27 does not have an aperture therein in the area covered by module 12. Aperture 46 of riser 27 is instead, as can be seen from FIG. 1, above module 12 and in the interior of a feed compartment in module 13. Thus, even though outlet conduit 66 is always open, no feed passes from the interior of riser 27 into outlet conduit 66 because there is no aperture in riser 27 in the interior of feed compartment 62. The structure shown in FIG. 4 is similar to the structure in the feed compartments in module 12 which contain risers 25 and 26. This way feed enters module 12 only by way of aperture 45 in riser 28 even though risers 25 through 27 may also be full of feed. It should be noted here that although a single aperture 45 is shown in the feed compartment for module 12, more than one aperture can be employed if desired, similar reasoning applying to the other feed apertures 46 through 48.

Each of modules 12 through 15 contains four feed compartments like compartments 50 and 62 of FIGS. 3 and 4. Each feed compartment of each module has a continually open outlet conduit such as conduits 4 and 66 of FIGS. 3 and 4, but only one riser feeds only one module at a time because of the upwardly staggered positioning of apertures 45 through 48 along the height of the module stack. Since each module has four feed compartments with their outlet conduits from the feed compartments open at all times, any module can be placed in any position in the stack of FIG. 1 and still have one of its feed compartments open to one of apertures 45 through 48. It can now be seen that modules 12 through 15 can be stacked on top of one another in any random order and still be assured that one of their four feed compartments will be open to one of the staggered feed apertures 45 through 48. This allows the operator at the water surface to lower any module into the water first and then lower the remaining modules into the water in any order because he does not have to worry about getting an outlet conduit in one of the modules aligned with one of feed apertures 45 through 48. This is the advantageous result of having all outlet conduits in all modules open at all times and having the staggered outlet apertures 45 through 48 control whether the feed in the interior of risers 25 through 28 passes into a module or not.

Figure 5:
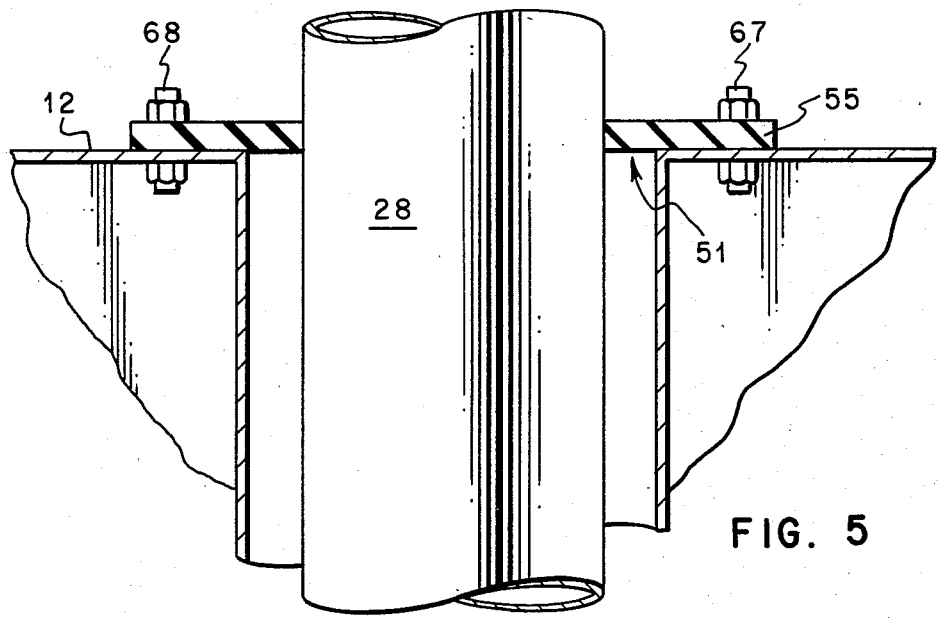
FIG. 5 is an enlarged view of one seal means within this invention for sealing a module feed compartment around a feed riser.

FIG. 5 shows greater detail of FIG. 3 in relation to seal means 55. Seal 55 is shown to be an elastomeric pack-off member which is bolted to module 12 by way of, for example, bolts 67 and 68.

Figure 6:
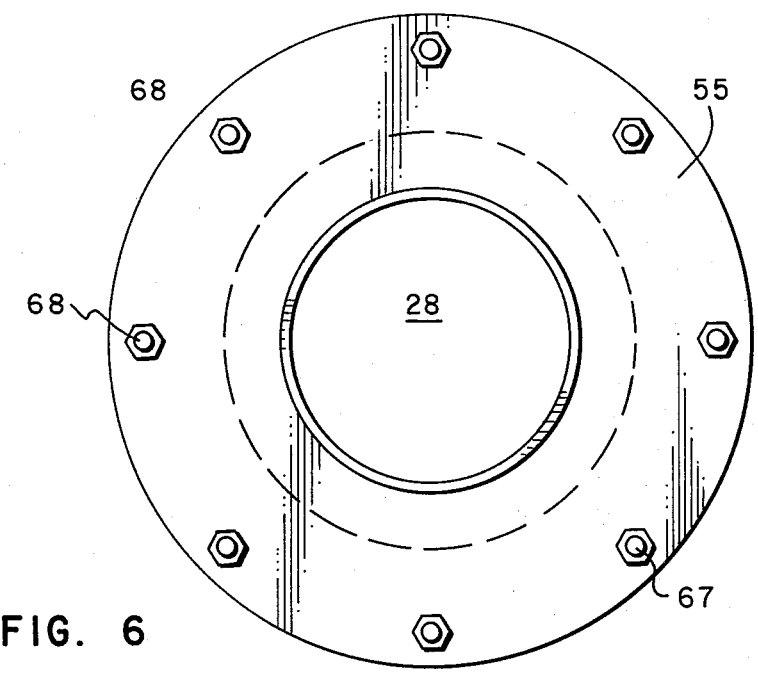
FIG. 6 is a top view of the seal means of FIG. 5.

FIG. 6 is a top view of seal means 55 and shows its annular configuration with a plurality of bolt holes therearound for receivng bolts such as 67 and 68 of FIG. 5. Riser 28 passes through the central opening in seal means 55. Seal means 55 can be any flexible member or other well known means for closing an annulus and sealing against a movable member passing therethrough.

Figure 7:
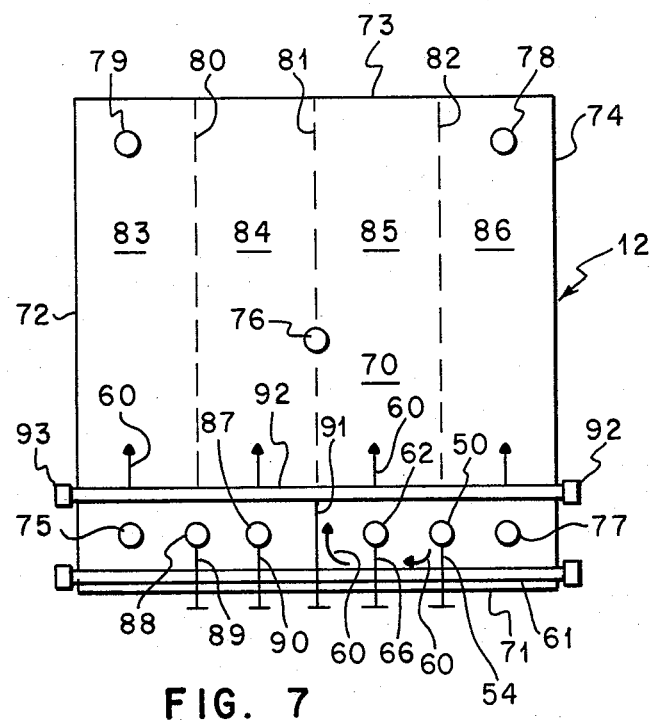
FIG. 7 is a top view of the interior of a module within this invention.

FIG. 7 shows module 12 to be essentially a square device having four upstanding side walls closed with a top and bottom member to provide an interior closed chamber where the sea life are to reside. The configuration of the modules of this invention can be rectangular or polygonal or round or any other configuration which allows for stacking as shown in FIG. 1 and has at least one side wall, for example, a single curving side wall, and a top and bottom closure.

FIG. 7 shows module 12 viewed from the top with the top member removed thereby exposing bottom member 70 and upstanding side walls 71, 72, 73 and 74. Bottom member 70 has apertures 75, 76, 77, 78 and 79 therein which are spaced apart to correspond with and receive guide means 16 through 20, respectively. The inner chamber of module 12 can be left open or, if desired, one or more partition means as shown by dotted lines 80, 81 and 82 can be employed to provide sub-chambers 83, 84, 85 and 86 thereby providing greater surface area for the sea life to cling to if necessary. Feed compartments 50, 62, 87 and 88 are also shown. Outlet conduits 54 and 66 which are operably connected to feed compartments 50 and 62, respectively, extend to and connect with the manifold means carried by module 12. Similarly, outlet conduits 89 and 90 which are operably connected to feed compartments 88 and 87, respectively, are in open connection with the same manifold means so that feed 60 from aperture 45 passes through outlet conduit 54 into first manifold pipe 61.

Manifold pipe 61 is operably connected to a second manifold pipe 91 which extends further into the interior chamber of module 12. Second pipe 91 is operably connected to third pipe 92 which extends laterally across the full width of chamber 12 and carries a plurality of apertures therein to discharge feed 60 uniformly across the width of the module. Of course, if sub-chambers 83, 84, 85 and 86 are present, a discharge aperture in pipe 92 should be present in each sub-chamber. Each straight pipe length has an end extending through a side wall of the module. The end is terminated with a removable cap for access to the interior of the pipe to wash out any material therein that may be clogging the pipe. For example, both ends of third pipe 92 extend through sides 72 and 74 and are terminated with removable cap means 92 and 93 for such wash out purposes, similar cap means being employed for pipes 54, 61, 66, 91, 90 and 89.

If module 12 were to be re-employed at the top of the stack, i.e., the position shown for module 15 in FIG. 1, then risers 26, 27 and 28 in compartments 87, 62 and 50, respectively, would have no apertures in those compartments and no feed would enter the manifold means by way of outlet conduits 90, 66 or 54 even though those outlet conduits are open at all times. Rather, feed compartment 88 would contain feed that would pass into outlet conduit 89 and thence into the manifold means and out into the interior chamber of the module because only riser 25 has an aperture at that level on the stack. Similarly, if module 12 were re-employed in the place of module 14 in FIG. 1, only feed compartment 87 would have feed passing through outlet conduit 90 and then through the manifold into the interior chamber or chambers of the module by way of aperture 47. Finally, if module 12 were re-employed in place of module 13 in FIG. 1, only feed compartment 62 would contain feed because of aperture 46 in riser 27.

Figure 8:
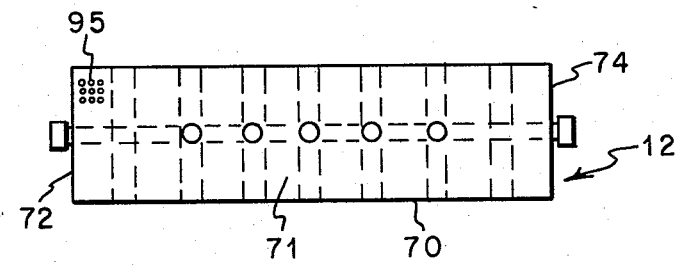
FIG. 8 is a front view of the module of FIG. 7.

FIG. 8 shows a front view of module 12 in FIG. 7, and shows a plurality of apertures 95 in front side 71 to allow for ingress and/or egress of sea water in relation to the interior chamber of the module. Any desired number of perforations 95 can be employed in side 1 and in one or more of sides 72 through 74 as well as the top and bottom members as desired.

Figure 9:
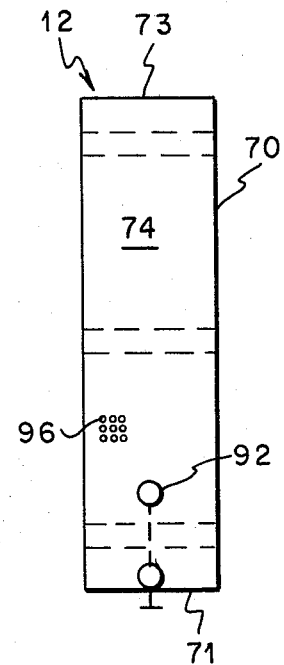
FIG. 9 is a side view of the module of FIG. 7.

FIG. 9 is a side view of module 12 of FIG. 7 showing additional apertures 96 in side 74.

Although the apparatus of this invention has been described hereinabove for sake of simplicity and clarity in respect to passing feed material through the various conduits, risers, apertures, etc. of this invention, it is obvious that the use of these various members is not limited, nor or they intended to be limited, only to use for feed purposes. Rather, any desired material that will pass through such members can be passed therethrough and, as such, is within the scope of this invention.

Reasonable variations and modifications are possible within the scope of this disclosure without departing from the spirit and scope of this invention.

The embodiments of the invention in which an exclusive property or privilege is claimed are defined as follows:

1. An apparatus for growing sea life in a plurality of upwardly stacked individual habitat modules comprising a base means adapted to rest on the sea floor, said base means carrying a support means for receiving and supporting the lower-most module in said stack of modules, guide means carried by said base and/or support means for aligning said modules into said stacked configuration and for guiding said modules toward said support means as each module is lowered through the water, at least two enclosed habitat modules for holding said sea life, each module having at least one upstanding side closed by a top and bottom to define a closed chamber for holding said sea life, at least two riser means carried by said base and/or support means, there being one riser for each module in said stack of modules, each module having a plurality of enclosed feed compartments therein which extend through the height of said module from top to bottom, the number of said compartments in each module corresponding to the number of said risers, each said compartment being sized to allow a riser to pass therethrough and having seal means at its top and bottom openings for sealing around the periphery of said riser, each riser having an outlet aperture, the outlet apertures on said risers being staggered along the height of said module stack so that the outlet aperture for a given riser corresponds with only one of the modules in said stack and each riser thereby communicates with only a single module in said stack, each compartment in each module having an outlet conduit operably connected thereto, each module carries a manifold means which is operably connected to all outlet conduits in its corresponding module so that said manifold is open to all of the compartments in said module at all times, said manifold having at least one discharge aperture therein for discharging the contents of said manifold into the closed chamber of said module.

2. The apparatus according to claim 1 wherein individual conduit means are connected to each riser, and all said conduit means are of a length sufficient to reach the water surface.

3. The apparatus according to claim 1 wherein each said module has at least one partition in its closed chamber thereby dividing said chamber into a plurality of sub-chambers, and there is a manifold aperture in each sub-chamber.

4. The apparatus according to claim 1 wherein a first flange means is carried by either said base or support means, said flange means having an aperture therein for each riser, individual base conduit means connecting each said aperture with a single riser, said flange means being adapted to seal with a mating second flange means which is carried by a plurality of surface conduit means extending from the water surface down to said first flange means so that after said first and second flange means are connected material can be passed from the water surface through an individual water surface conduit, through aligned apertures in said flange means, and through an individual base conduit into a single riser and then to one of the stacked modules.

5. The apparatus according to claim 1 wherein all risers extend through the full height of the module stack.

* * * * *